United States Patent
Nomura et al.

(10) Patent No.: US 8,251,464 B2
(45) Date of Patent: Aug. 28, 2012

(54) BRAKE FLUID PRESSURE CONTROL DEVICE FOR VEHICLES

(75) Inventors: Nobuyuki Nomura, Nagano (JP); Takeshi Kojima, Saitama (JP)

(73) Assignees: Nissin Kogyo Co., Ltd., Ueda-shi (JP); Honda Motor Co., Ltd., Tokyo (JP)

( * ) Notice: Subject to any disclaimer, the term of this patent is extended or adjusted under 35 U.S.C. 154(b) by 620 days.

(21) Appl. No.: 11/493,929

(22) Filed: Jul. 27, 2006

(65) Prior Publication Data

US 2007/0024115 A1 Feb. 1, 2007

(30) Foreign Application Priority Data

Jul. 28, 2005 (JP) ................................. 2005-218766

(51) Int. Cl.
*B60T 8/62* (2006.01)

(52) U.S. Cl. ..................... 303/187; 303/161; 303/116.1; 303/119.1

(58) Field of Classification Search ................... 303/187, 303/116.1, 116.2, 119.1, 119.2, 160, 161, 303/162, 169, 170

See application file for complete search history.

(56) References Cited

U.S. PATENT DOCUMENTS

| 4,844,555 | A | * | 7/1989 | Maehara | 303/122.09 |
| 5,329,805 | A | * | 7/1994 | Yahagi et al. | 73/9 |
| 5,375,919 | A | * | 12/1994 | Furuhashi | 303/119.1 |
| 6,345,869 | B1 | * | 2/2002 | Matsuo et al. | 303/116.1 |

FOREIGN PATENT DOCUMENTS

| JP | 10-506345 | 6/1998 |
| JP | 2001-080488 | 3/2001 |

* cited by examiner

*Primary Examiner* — Xuan Lan Nguyen

(74) *Attorney, Agent, or Firm* — Kratz, Quintos & Hanson, LLP

(57) ABSTRACT

A brake fluid pressure control device for vehicles is provided capable of adjusting with a simple control a brake fluid pressure applied to a wheel brake. The control device includes for each system of an X-pipe arrangement: a cut valve as a linear solenoid valve provided to a first fluid pressure path; a pump capable of pressurizing brake fluid on a side toward the wheel brakes than the cut valve on the first fluid pressure path; and a control valve provided on the second fluid pressure path. The control device further includes: a target fluid pressure setting portion for setting a target fluid pressure for each of the wheel brake; and a valve actuating portion for drive-controlling the cut valve and the control valve, based on the target fluid pressure. The valve actuating portion performs for each of the systems the operations of drive-controlling the cut valve by using a higher one of the target fluid pressures of the wheel brakes as a target fluid pressure of the first fluid pressure path, to control the wheel brake having the higher target fluid pressure by driving only the cut valve, and of controlling a wheel brake having a lower target fluid pressure by driving the control valve corresponding to the wheel brake having the lower target fluid pressure.

4 Claims, 9 Drawing Sheets

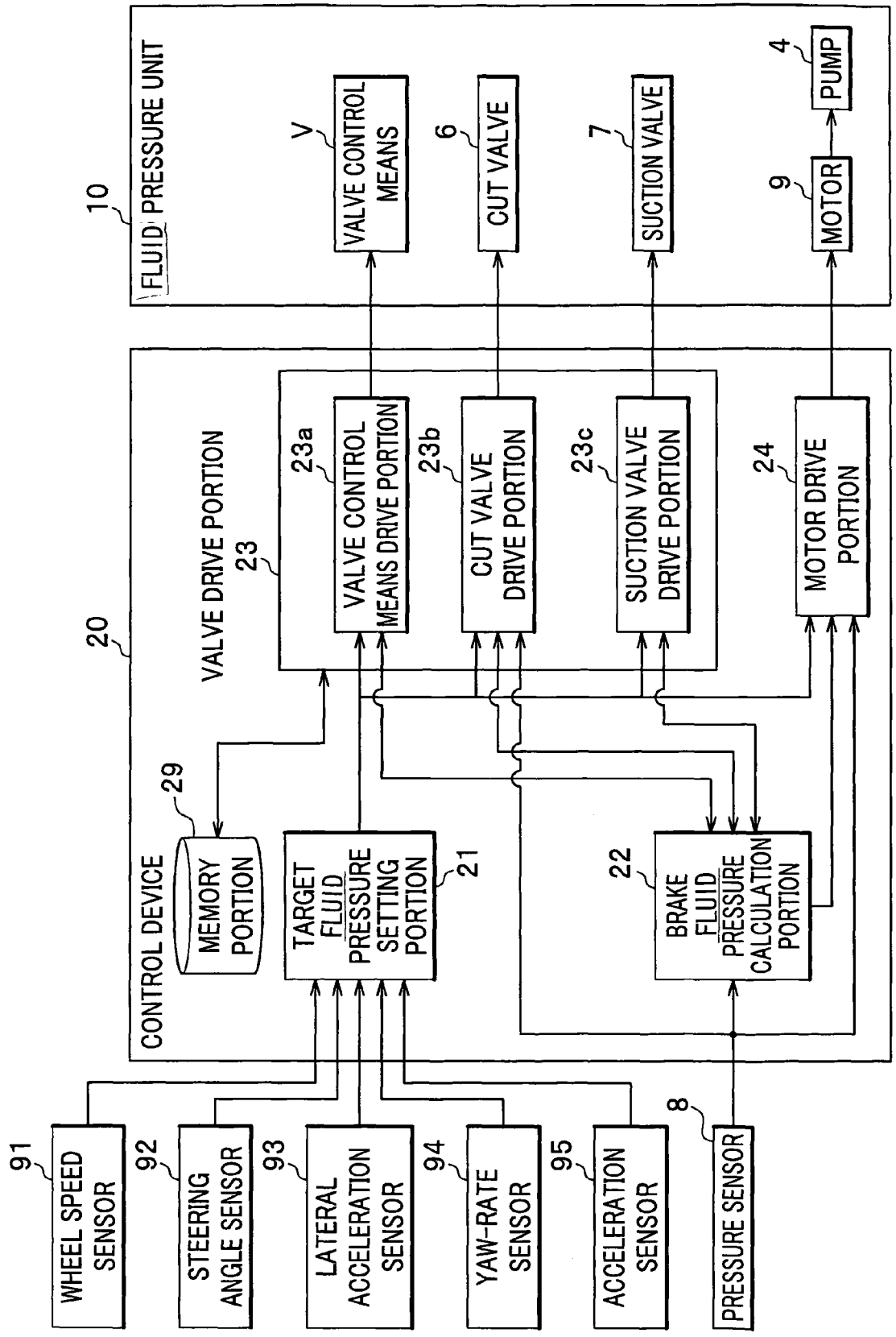

| ROTATION NUMBER OF MOTOR 9 \ TARGET FLUID PRESSURE $PP_{REG}$ | $PP_1$ | $PP_2$ | $PP_3$ | $PP_4$ |
|---|---|---|---|---|
| $r_1$ | $I_{11}$ | $I_{12}$ | $I_{13}$ | $I_{14}$ |
| $r_2$ | $I_{21}$ | $I_{22}$ | $I_{23}$ | $I_{24}$ |
| $r_3$ | $I_{31}$ | $I_{32}$ | $I_{33}$ | $I_{34}$ |

| ROTATION NUMBER OF MOTOR 9 \ TARGET FLUID PRESSURE $PP_{REG}$ | $PP_1$ | $PP_2$ | $PP_3$ | $PP_4$ |
|---|---|---|---|---|
| $r_1$ | $I_{11}'$ | $I_{12}'$ | $I_{13}'$ | $I_{14}'$ |
| $r_2$ | $I_{21}'$ | $I_{22}'$ | $I_{23}'$ | $I_{24}'$ |
| $r_3$ | $I_{31}'$ | $I_{32}'$ | $I_{33}'$ | $I_{34}'$ |

BRAKE FLUID PRESSURE CONTROL DEVICE FOR VEHICLES

CLAIM OF PRIORITY

The present application claims priority of Japanese patent application No. 2005-218766 filed on Jul. 28, 2005, the content of which is hereby incorporated by reference into this application.

BACKGROUND OF THE INVENTION

1. Field of the Invention

The present invention relates to a brake fluid pressure control device for vehicles.

2. Description of the Related Art

Conventionally, there has been known a brake fluid pressure control device for vehicles which uses a pump to increase a pressure of brake fluid from a master cylinder, such as disclosed in Japanese Patent Publication No. 10-506345.

This brake fluid pressure control device for vehicles has a cut valve (branch valve) for controlling the brake fluid pressure applied by the pump. The control device adjusts a brake fluid pressure applied to each wheel brake, by drive-control of valve control means (input and output valves) provided to the each wheel brake.

However, the conventional brake fluid pressure control device for vehicles has a problem that the device control is complicated due to drive-control of the cut valve and the valve control means of each wheel in order to adjust a brake fluid pressure of the each wheel brake.

In order to solve the above-mentioned problem, an object of the present invention is to provide a brake fluid pressure control device for vehicles, capable of adjusting with a simple control a brake fluid pressure applied to a wheel brake.

SUMMARY OF THE INVENTION

To solve the problem, in a first aspect of the invention, there is provided a brake fluid pressure control device for vehicles, having an X-pipe arrangement including: a first system connecting front left and rear right wheel brakes; and a second system connecting front right and rear left wheel brakes, the first and second systems each including a first fluid pressure path connected to fluid pressure supply means and a second fluid pressure path, the first fluid pressure path being connected via the second fluid pressure path to each of the wheel brakes of the first and second systems, to control a brake fluid pressure of each of the wheel brakes to a respective target fluid pressure, the brake fluid pressure control device for vehicles comprising for each of the systems of the X-pipe arrangement: a linear solenoid valve provided to the first fluid pressure path; a pump capable of pressurizing a brake fluid on a side toward the wheel brakes than the linear solenoid valve on the first fluid pressure path; and valve control means provided on the second fluid pressure path, and further comprising: a target fluid pressure setting portion for setting a target fluid pressure for each of the wheel brake; and a valve actuating portion for drive-controlling the linear solenoid valve and the valve control means, based on the target fluid pressure, the valve actuating portion performing, for each of the systems, the operations of drive-controlling the linear solenoid valve by using a higher one of the target fluid pressures of the wheel brakes as a target fluid pressure of the first fluid pressure path, to control a brake fluid pressure of the wheel brake having the higher target fluid pressure by driving only the linear solenoid valve, and of controlling a brake fluid pressure of a wheel brake having a lower target fluid pressure by driving the valve control means corresponding to the wheel brake having the lower target fluid pressure.

Such a brake fluid pressure control device for vehicles eliminates the need to drive-control the valve control means that corresponds to the wheel brake with the higher target fluid pressure in each of the systems, and thus can control with a simple control the brake fluid pressure applied to the wheel brake.

In addition, with the linear solenoid valve capable of functioning as a cut valve, the control device can reduce more noise than when using a non-linear solenoid valve as the cut valve.

Further, with the X-pipe arrangement, the solenoid valve can make the driving wheels less inclined to either left or right side compared to front/back piping, which further increases the vehicle behavioral stability of the vehicle.

Furthermore, because only the linear solenoid valve is used to drive the brake fluid pressure of the wheel brake with a higher target fluid pressure, traceability can be increased of the wheel brake with respect to the target brake fluid pressure.

In a second aspect of the invention, there is provided a brake fluid pressure control device for vehicles as set forth in the first aspect, wherein, when the pump pressurizes the brake fluid, the valve actuating portion performs for each of the systems the operation of driving the linear solenoid valve so that the larger the number of the brakes to be pressure-adjusted, the larger the amount of brake fluid to be returned from the linear solenoid valve to the side of the fluid pressure supply means, for a same target fluid pressure of the first fluid pressure path.

Such a brake fluid pressure control device for vehicles can prevent a difference in brake fluid pressure adjusted by the linear solenoid valve due to a difference in the number of wheel brakes for pressure-adjustment control.

Thus, the present invention can provide a brake fluid pressure control device for vehicles capable of adjusting with a simple control a brake fluid pressure applied to a wheel brake.

BRIEF DESCRIPTION OF THE DRAWINGS

FIG. 3 is a block diagram of a control device.

FIG. 8A is a map of offset currents.

FIG. 8B is a map of offset currents.

DESCRIPTION OF THE PREFERRED EMBODIMENTS

With reference to the drawings, an embodiment of the present invention will be described in detail.

Figure 1:
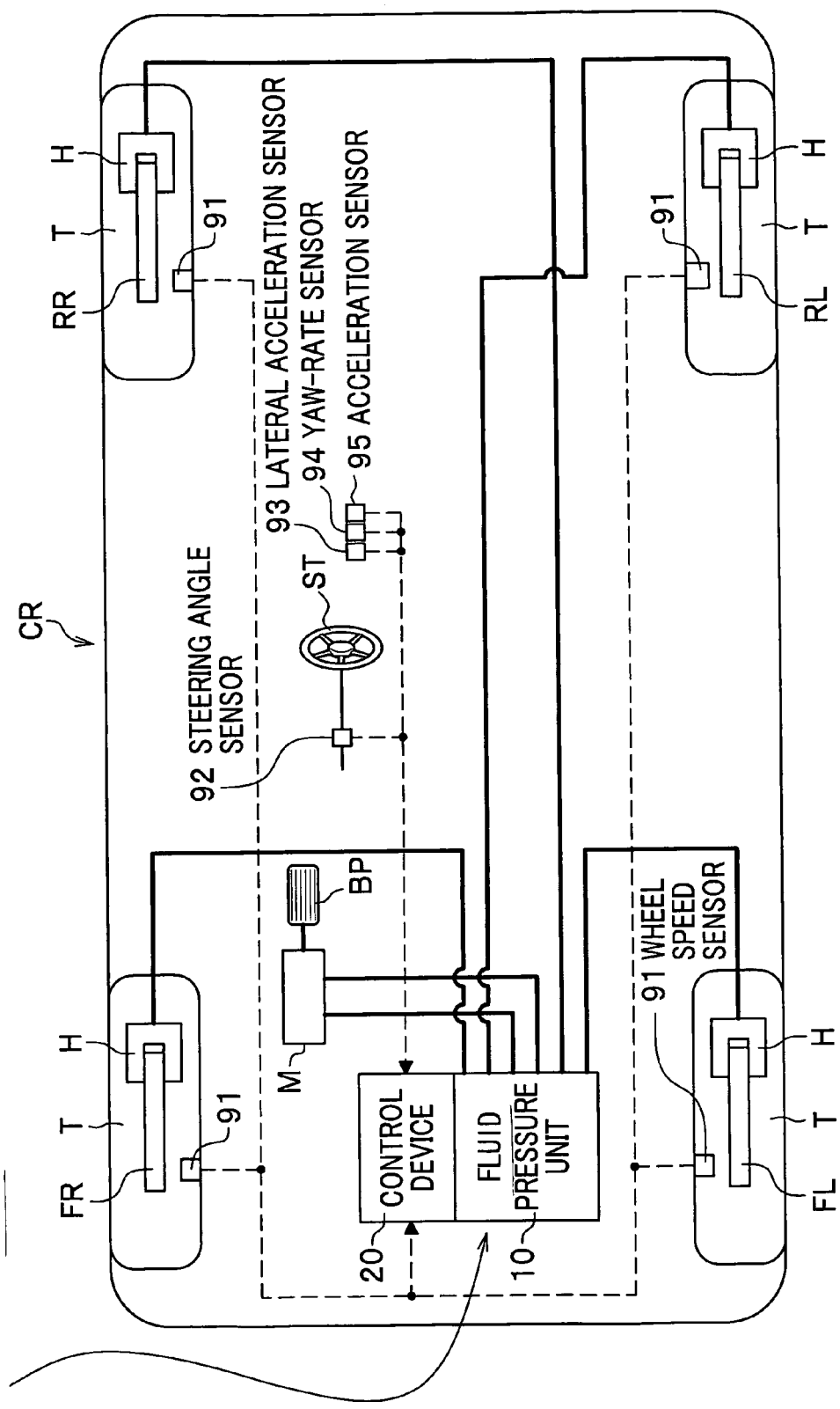
FIG. 1 is a block-diagram of a vehicle having a brake fluid pressure control device for vehicles according to an embodiment of the invention.
Figure 2:
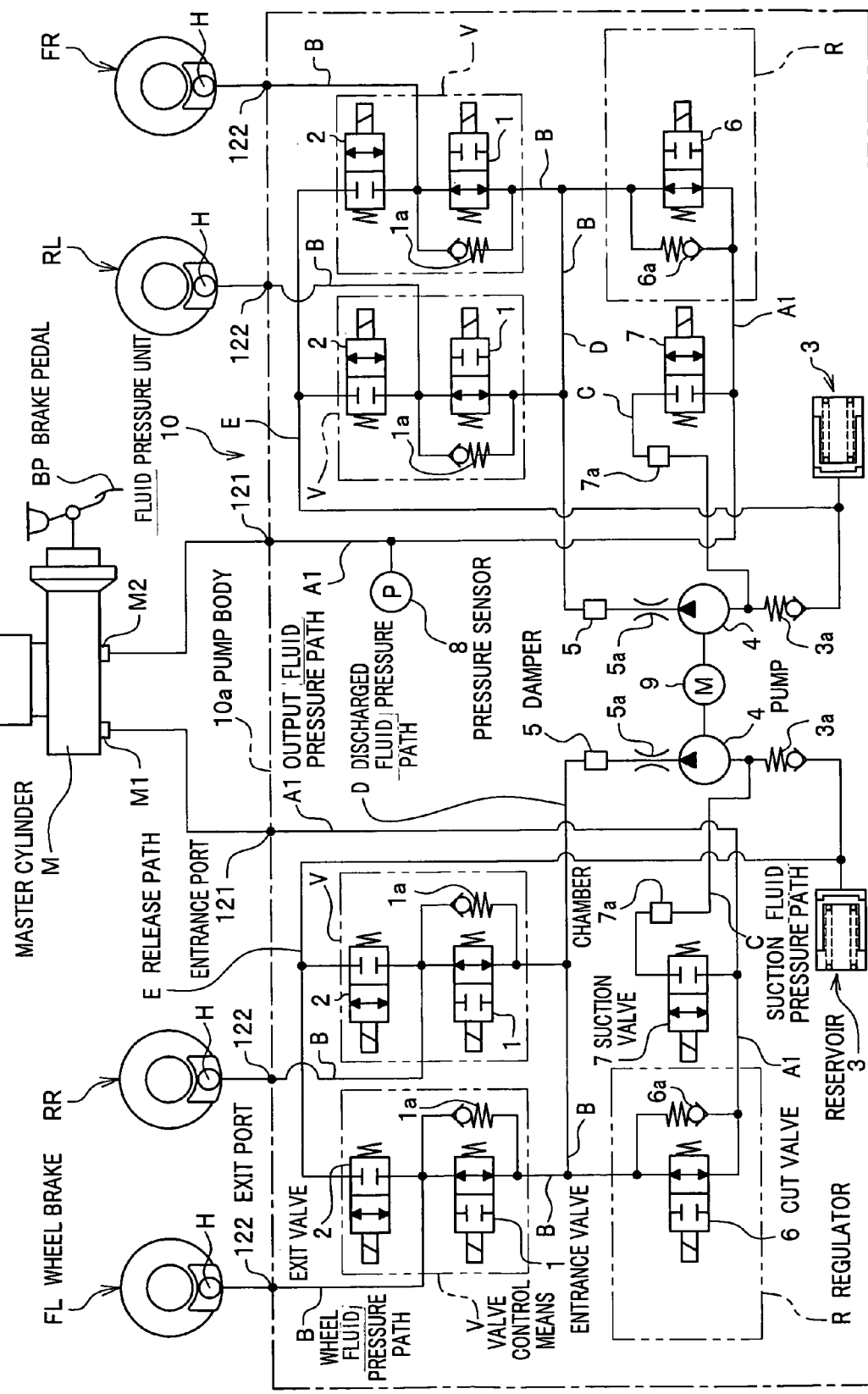
FIG. 2 is a schematic of a brake fluid pressure circuit of a brake fluid pressure control device for vehicles according to the embodiment.

In the drawings, FIG. 1 is a block-diagram of a vehicle having a brake fluid pressure control device for vehicles according to the invention. FIG. 2 is a schematic of a brake fluid pressure circuit of the brake fluid pressure control device for vehicles according to the invention.

As shown in FIG. 1, the brake fluid pressure control device for vehicles 100 is a device for appropriately controlling a braking force (brake fluid pressure) applied to each wheel T of a vehicle CR. The brake fluid pressure control device for vehicles 100 mainly comprises a fluid pressure unit 10 provided with fluid paths and various parts, and a control device 20 for appropriately controlling the parts in the fluid pressure unit 10. To the control device 20 of the brake fluid pressure control device for vehicles 100 are connected: a wheel speed sensor 91 for detecting a wheel speed of the wheel T; a steering angle sensor 92 for detecting a steering angle of a steering wheel ST; a lateral acceleration sensor 93 for detecting an acceleration laterally applied to the vehicle CR; a yaw-rate sensor 94 for detecting a rotational angular speed of the vehicle CR; and an acceleration sensor 95 for detecting an acceleration of the vehicle CR in front/back directions. Detection result of each of these sensors 91-95 is output to the control device 20.

The control device 20 has a CPU (Central Processing Unit), RAM (Random-Access Memory), ROM (Read-Only Memory), and input/output circuits, for example, and performs the control by executing arithmetic operations based on inputs from the wheel speed sensor 91, the steering angle sensor 92, the lateral acceleration sensor 93, the yaw-rate sensor 94, and the acceleration sensor 95, and on a program and data stored in the ROM. Wheel cylinders H are fluid pressure devices each for converting a brake fluid pressure generated by a master cylinder M and the brake fluid pressure control device for vehicles 100 into an application force to each of the wheel brakes FR, FL, RR, RL provided to the wheels T. The wheel cylinders H are each connected through a piping to the fluid pressure unit 10 of the brake fluid pressure control device for vehicles 100.

As shown in FIG. 2, the fluid pressure unit 10 is placed between the master cylinder M and the wheel brakes FR, FL, RR, RL. The master cylinder M is fluid pressure supply means that generates a brake fluid pressure based on a pressure applied by a driver to a brake pedal BP. The fluid pressure unit 10 comprises a pump body 10a, entrance valves 1 and exit valves 2 provided on the fluid paths. The pump body 10a is a base body having fluid paths through which the brake fluid flows. The master cylinder M has two output ports M1, M2 connected to entrance ports 121 of the pump body 10a. The pump body 10a has exit ports 122 respectively connected to the brakes FR, FL, RR, RL. In a normal state, the fluid paths communicates from the entrance ports 121 to the exit ports 122, and a pressure on the brake pedal BP is transmitted to the wheel brakes FL, RR, RL, FR through the fluid paths.

As shown in FIG. 2, the fluid pressure unit 10 of the brake fluid pressure control device for vehicles 100 is placed between the master cylinder M for generating a brake fluid pressure in response to a pressure applied by a driver to the brake pedal BP, and the wheel brakes FL, FR, RL, RR. The two output ports M1, M2 of the master cylinder M are connected to the entrance ports 121 of the fluid pressure unit 10. The exit ports 122 of the fluid pressure unit 10 are respectively connected to the wheel brakes FL, FR, RL, RR. In a normal state, the fluid paths communicates from the entrance ports 121 to the exit ports 122, and a pressure on the brake pedal BP is transmitted to the wheel brakes FL, FR, RL, RR through the fluid paths.

Here, the fluid paths starting from the output port M1 communicate with the wheel brake FL for the front left wheel and the wheel brake RR for the rear right wheel. The fluid paths starting from the output port M2 communicate with the wheel brake FR for the front right wheel and the wheel brake RL for the rear left wheel. Hereinafter, the fluid paths starting from the output port M1 and M2 will be referred to as "first system and second system", respectively.

The fluid pressure unit 10 has in the first system two valve control means V corresponding to the wheel brakes FL, RR, respectively, and also in the second system, two valve control means V corresponding to the wheel brakes RL, FR, respectively. The fluid pressure unit 10 comprises, in each of the first and second systems, a reservoir 3, pump 4, damper 5, orifice 5a, regulator R, suction valve 7, and chamber 7a, and further comprises a common motor (direct-current motor) 9 for driving the pumps 4 in the first and second systems. The motor 9 can control its rotation number. In this embodiment, this control is conducted by duty-control, and only the second system is provided with a pressure sensor 8.

Hereinafter, an fluid path leading from the output ports M1, M2 of the master cylinder M to each of the regulators R will be referred to as an "output fluid pressure path A1". An fluid path leading from the each regulator R in the first and second systems to the wheel brakes FL, RR and RL, FR, respectively, will be referred to as a "wheel fluid pressure path B". An fluid path leading from the output fluid pressure path A1 to the pump 4 will be referred to as a "suction fluid pressure path C", that leading from the pump 4 to the wheel fluid pressure path B as a "discharged fluid pressure path D", and that leading from the wheel fluid pressure path B to the suction fluid pressure path C as a "release path E".

Here, the "output fluid pressure path A1" and the "wheel fluid pressure path B" correspond to "first fluid path" and "second fluid path", respectively, as used in the claims.

The valve control means V has a function to perform switching among states of: an increased pressure wherein the wheel fluid pressure path B is released while the release path E shut off; a decreased pressure wherein the wheel fluid pressure path B is shut off while the release path E released; and a maintained pressure wherein the wheel fluid pressure path B is shut off while the release path E released. The valve control means V comprises the entrance valve 1, the exit valve 2, and a check valve 1a.

The entrance valve 1 is a normally-open type magnetic valve provided between each of the brakes FL, RR, RL, FR and the master cylinder M, that is, on the wheel fluid pressure path B. By being open in a normal state, the entrance valve 1 permits a brake fluid pressure to be transmitted from the master cylinder M to each of the brakes FL, FR, RL, RR. When the wheel T is likely to be locked, the entrance valve 1 is blocked by the control device 20, thereby shutting off a brake fluid pressure transmitting from the brake pedal BP to each of the brakes FL, FR, RL, RR.

The exit valve 2 is a normally-closed type magnetic valve provided between each of the brakes FL, RR, RL, FR and each of the reservoirs 3, in other words, between the wheel fluid pressure path B and the release path E. Although normally blocked, the control device 20 releases the exit valve 2 when the wheel T is likely to be locked, thereby releasing a brake fluid pressure being applied on each of the brakes FL, FR, RL, RR to each of the reservoirs 3.

The check valve 1a is parallel-connected to each of the entrance valves 1. The check valve 1a permits only an inflow of brake fluid from the side of the wheels FL, FR, RL, RR to the side of the master cylinder M. The check valve 1a permits a flow of brake fluid from the side of the wheels FL, FR, RL, RR to the side of the master cylinder M, even if the entrance valve 1 is closed when an input is released from the brake pedal B.

The reservoir 3 is provided on the release path E, and has a function to absorb a brake pressure released when the exit valve 2 is released. Between the reservoir 3 and the pump 4 is provided a check valve 3a for permitting only an inflow of brake fluid from the reservoir 3 to the pump 4.

The pump 4 is provided between the suction fluid pressure path C communicating with the output fluid pressure path A1 and the discharged fluid pressure path D communicating with the wheel fluid pressure path B. The pump 4 has a function for sucking brake fluid stored in the reservoir 3 and discharging the fluid into the discharged fluid pressure path D. This function recovers the pressure states of the output fluid pressure path A1 and the wheel fluid pressure path B decreased by the absorption of brake fluid pressure by the reservoir 3. The pump 4 further has a function for sucking brake fluid stored in the master cylinder M, the output fluid pressure path A1, the suction fluid pressure path C, and the chamber 7a, and then discharging the fluid to the discharged fluid pressure path D, when an inflow of brake fluid from the output fluid pressure path A1 to the wheel fluid pressure path B is shut off by a cut valve 6 (to be described later), and when the suction fluid pressure path C is released by a suction valve 7 (to be described later). Thus, it becomes possible to apply a brake fluid pressure on each of the wheel brakes FL, FR, RL, RR when the pedal is not operated. In other words, the pump 4 can apply a brake fluid pressure on the side toward the wheel brakes FL, RR (RL, FR) more than the cut valve 6 on the output fluid pressure path A1. The amount of the brake fluid discharged by the pump 4 depends on a rotation number (duty ratio) of the motor 9. That is, the larger the rotation number (duty ratio) of the motor 9, the larger the amount of the brake fluid discharged by the pump 4.

The damper 5 and the orifice 5a cooperate to damp pulsation of a pressure of brake fluid discharged from the pump 4, and pulsation resulting from operating the regulator R (to be described later).

The regulator R has a function for switching between states of permitting and blocking an inflow of brake fluid from the output fluid pressure path A1 to the wheel fluid pressure path B. The regulator R also has a function for adjusting brake fluid pressures of the wheel fluid pressure path B and the discharged fluid pressure path D to or less than a predetermined value, when the inflow of brake fluid is shut off from the output fluid pressure path A1 to the wheel fluid pressure path B. The regulator R comprises the cut valve 6 and the check valve 6a.

The cut valve 6 is a normally-open type linear solenoid valve provided between the output fluid pressure path A1 communicating with the master cylinder M and the wheel fluid pressure path B communicating with each of the wheel brakes FL, FR, RL, RR. The cut valve 6 switches between states of permitting and shutting off an inflow of brake fluid from the output fluid pressure path A1 to the wheel fluid pressure path B. In other words, the cut valve 6 is a linear solenoid valve capable of adjusting a valve opening pressure by controlling an electric conduction to the solenoid. By being open in a normal state, the cut valve 6 permits a brake fluid pressure to transmit from the master cylinder M to each of the wheel brakes FL, FR, RL, RR. The cut valve 6 is blocked by controlling the control device 20, when the pump 4 is operated while the pedal is not operated, in other words, when a brake fluid pressure is applied to each of the brakes FL, FR, RL, RR while the pedal is not operated. Further, the cut valve 6 can control a pressure of the wheel fluid pressure path B by adequately releasing the pressure to the output fluid pressure path A1, using a balance between a fluid pressure applied from the wheel fluid pressure path B to the regulator R and a force closing the valve (thrust f to be described later) controlled by applying electricity to the solenoid.

The check valve 6a is parallel-connected to each of the cut valves 6. The check valve 6a is a one-way valve which permits a flow of brake fluid from the output fluid pressure path A1 to the wheel fluid pressure path B.

The suction valve 7 is a normally-closed type magnetic valve provided to the suction fluid pressure path C, for switching between states of opening and shutting off of the suction fluid pressure path C. The suction valve 7 is released of the control by the control device 20, when the pedal is not operated while an inflow of brake fluid is shut off by the cut valve 6 from the output fluid pressure path A1 to the wheel fluid pressure path B, i.e., when the pedal is not operated while a brake fluid pressure is applied to each of the wheel brakes FL, FR, RL, RR.

The chamber 7a is provided on the suction fluid pressure path C between the pump 4 and the suction valve 7. The chamber 7a reserves the brake fluid, thereby increasing the capacity of the brake fluid contained in the suction fluid pressure path C.

The pressure sensor 8 detects a brake fluid pressure in the output fluid pressure path A1, and the detection results are imported to the control device 20 as needed. The control device 20 determines whether a brake fluid pressure is being output from the master cylinder M, i.e., the brake pedal BP is being stepped on. The vehicle CR is controlled based on the magnitude of the brake fluid pressure detected by the pressure sensor 8.

FIG. 3 is a block diagram of the control device.

As shown in FIG. 3, the control device 20 controls the valve control means V in the fluid pressure unit 10, opening and closing operations of the cut valve 6 and the suction valve 7, and an operation of the motor 9, based on a signal inputted from each of the sensors 91-95, so as to control an operation of each of the wheel brakes FL, RR, RL, FR. The control device 20 comprises, as functional portions, a target fluid pressure setting portion 21, a brake fluid pressure calculation portion 22, a valve actuating portion 23, and a motor drive portion 24.

The target fluid pressure setting portion 21 selects a control logic based on a signal inputted from each of the sensors 91-95, and sets target fluid pressures $PP_{FL}$, $PP_{RR}$, $PP_{RL}$, $PP_{FR}$ of the wheel brakes FL, RR, RL, FR, respectively, based on the control logic. This setting may be carried out using a conventional method, and no limitation is placed on the setting method. To take an example, a vehicle body speed is calculated from a wheel speed of the four wheels T, and a slip ratio is calculated from the wheel speed and vehicle body speed. Then, a combined acceleration is calculated based on a lateral acceleration and an acceleration in forward or backward direction of the vehicle CR. The combined acceleration is used to deduce a friction coefficient of the road surface. Finally, based on the friction coefficient, the slip ratio, and current brake fluid pressures $P_{FL}$, $P_{RR}$, $P_{RL}$, $P_{FR}$ of the wheel cylinders H, it becomes possible to set the target fluid pressures $PP_{FL}$, $PP_{RR}$, $PP_{RL}$, $PP_{FR}$ of the wheel brakes FL, RR, RL, FR, respectively.

The target fluid pressure setting portion 21 compares between those belonging to a same system out of the target fluid pressures $PP_{FL}$, $PP_{RR}$, $PP_{RL}$, $PP_{FR}$, and then sets the highest target fluid pressure as the target fluid pressure $PP_{REG}$ of the cut valve 6 in the system. The target fluid pressure $PP_{REG}$ is a target fluid pressure in the output fluid pressure path A1 on the side closer to the wheel brakes than the cut valve 6. The target fluid pressure $PP_{REG}$ is adjusted by the cut valve 6.

Each of the target fluid pressures $PP_{FL}$, $PP_{RR}$, $PP_{RL}$, $PP_{FR}$, $PP_{REG}$ thus set is adequately output to the valve actuating portion 23 and the motor drive portion 24.

The brake fluid pressure calculation portion 23 calculates the brake fluid pressures $P_{FL}$, $P_{RR}$, $P_{RL}$, $P_{FR}$ of the wheel brakes FL, RR, RL, FR, respectively, based on a brake fluid pressure detected by the pressure sensor 8 and on a drive amount of each of the magnetic valves 1, 2, 6 by the valve actuating portion 23.

The calculated brake fluid pressures are output to the valve actuating portion 23 and the motor drive portion 24.

The valve actuating portion 23 outputs a pulse signal to the fluid pressure unit 10 so that a brake fluid pressure of the wheel cylinder H of each of the wheel brakes FL, RR, RL, FR matches the target fluid pressure set by the target fluid pressure setting portion 22. The pulse signal operates, in a conventional known method, each of the entrance valves 1, the exit valves 2, the cut valves 6, and the suction valves 7 in the fluid pressure unit 10. This pulse signal is such that, for example, the larger the difference between current brake fluid pressures $P_{FL}$, $P_{RR}$, $P_{RL}$, $P_{FR}$ of the wheel cylinder H and the target fluid pressures $PP_{FL}$, $PP_{RR}$, $PP_{RL}$, $PP_{FR}$, the more pulses are output.

The valve actuating portion 23 determines to drive and then drives each of the valve control means V, the cut valve 6, and the suction valve 7 based on each of the target fluid pressures $PP_{FL}$, $PP_{RR}$, $PP_{RL}$, $PP_{FR}$, $PP_{REG}$, the cut valve fluid pressure $P_{REG}$, and each of the brake fluid pressures $P_{FL}$, $P_{RR}$, $P_{RL}$, $P_{FR}$. The valve actuating portion 23 comprises a valve control means drive portion 23a for driving the valve control means V, a cut valve actuating portion 23b for driving the cut valve 6, and a suction portion 23c for driving the suction valve 7.

The motor drive portion 24 determines a rotation number of and drives the motor 9, based on each of the target fluid pressures $PP_{FL}$, $PP_{RR}$, $PP_{RL}$, $PP_{FR}$, $PP_{REG}$, the cut valve fluid pressure $P_{REG}$, and each of the brake fluid pressures $P_{FL}$, $P_{RR}$, $P_{RL}$, $P_{FR}$. That is, the motor drive portion 24 drives the motor 9 by controlling the rotation number of the motor. In this embodiment, the rotation number is controlled by duty-control.

(Drive-Control of Valve Control Means and Cut Valve Based on Target Fluid Pressure)

Now, focusing on the second system having the wheel brakes FR, RL, a more detailed description will be made on the drive-control of the valve control means drive portion 23a and the cut valve actuating portion 23b.

Figure 4A:
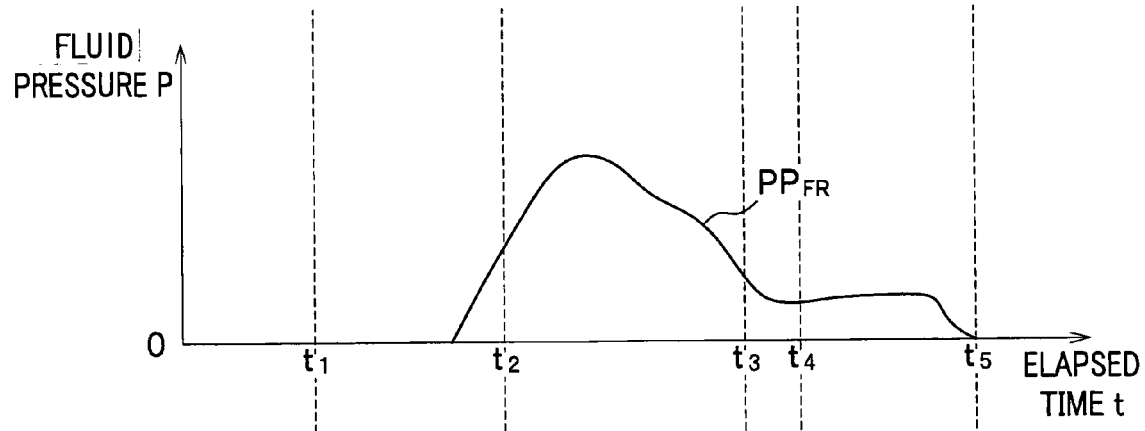
FIG. 4A is a graph showing a target fluid pressure of a wheel brake of a front right wheel.
Figure 4B:
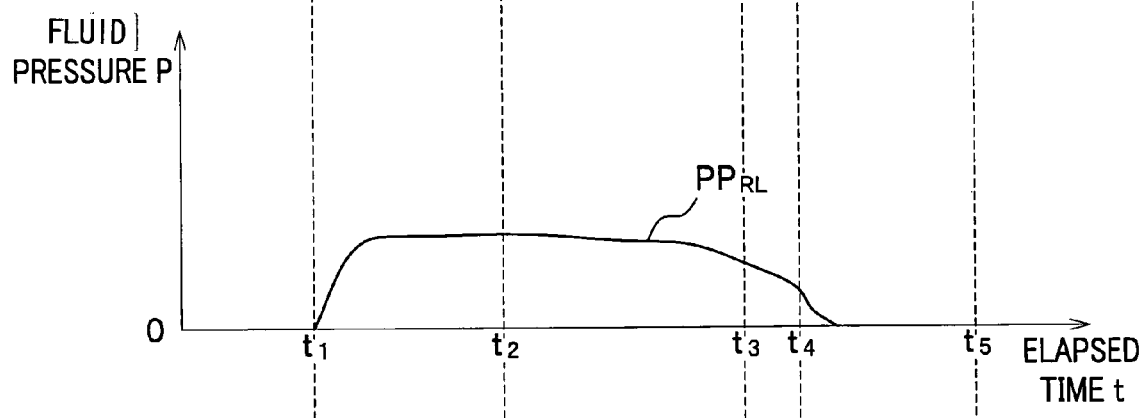
FIG. 4B is a graph showing a target fluid pressure of a wheel brake of a rear left wheel.

FIGS. 4A, 4B are graphs showing a target fluid pressure of a wheel brake of front right and rear left wheels, respectively.

Figure 4C:
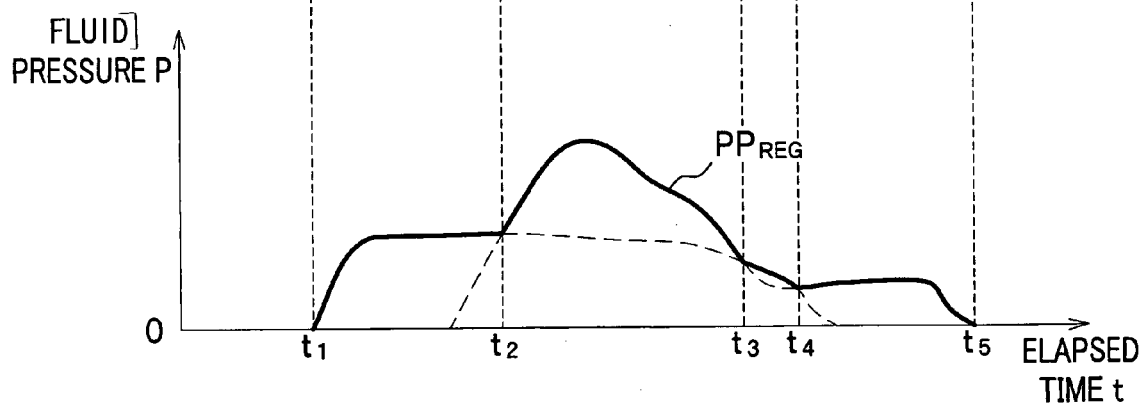
FIG. 4C is a graph illustrating a target fluid pressure of a cut valve.

FIG. 4C is a graph illustrating a target fluid pressure of the cut valve. In these graphs, vertical and horizontal axes depict pressure P and elapsed time t, respectively.

As shown in the graphs, the target fluid pressure of the cut valve of the cut valve 6 is a higher one of the target fluid pressure $PP_{FR}$ of the front right wheel brake FR and the target fluid pressure $PP_{RL}$ of the rear left wheel brake RL.

In other words, during elapsed times t1-t2 and t3-t4, the target fluid pressure $PP_{RL}$ of the rear left wheel brake RL is employed as the target fluid pressure $PP_{REG}$ of the cut valve 6. During elapsed times t2-t3 and t4-t5, the target fluid pressure $PP_{FR}$ of the front right wheel brake FR is employed as the target fluid pressure $PP_{REG}$ of the cut valve 6.

Thus, drive-controls by the valve control means drive portion 23a and the cut valve actuating portion 23b in each of the elapsed times are as follows.

(1) During Elapsed Times t1-t2 and t3-t4

The cut valve actuating portion 23b drives the cut valve 6 so that the cut valve fluid pressure $P_{REG}$ tracks the target fluid pressure $PP_{REG}(=PP_{RL})$.

The valve control means drive portion 23a stops driving the valve control means V on the side of the rear left wheel brake RL. That is, the valve control means drive portion 23a renders the entrance valve 1 and the exit valve 2 on the side of the rear left wheel brake RL into opened and closed states, respectively, to prevent the valve control means V from controlling the brake fluid pressure $P_{FR}$ of the rear left wheel brake RL. The drive portion 23a also drives the valve control means V on the side of the front right wheel brake FR so that the brake fluid pressure $P_{FR}$ tracks the target fluid pressure $PP_{FR}$.

(2) During Elapsed Times t2-t3 and t4-t5

The cut valve actuating portion 23b drives the cut valve 6 so that the cut valve fluid pressure $P_{REG}$ tracks the target fluid pressure $PP_{REG}(=PP_{FR})$.

The valve control means drive portion 23a stops driving the valve control means V on the side of the front right wheel brake FR. That is, the valve control means drive portion 23a renderes the entrance valve 1 and the exit valve 2 on the side of the front right wheel brake FR into opened and closed states, respectively, to prevent the valve control means V from controlling the brake fluid pressure $P_{FR}$ of the front right wheel brake FR. The drive portion 23a also drives the valve control means V on the side of the rear left wheel brake RL so that the brake fluid pressure $P_{RL}$ tracks the target fluid pressure $PP_{RL}$.

Next will be described a brake fluid pressure control process by the control device 20.

Figure 5:
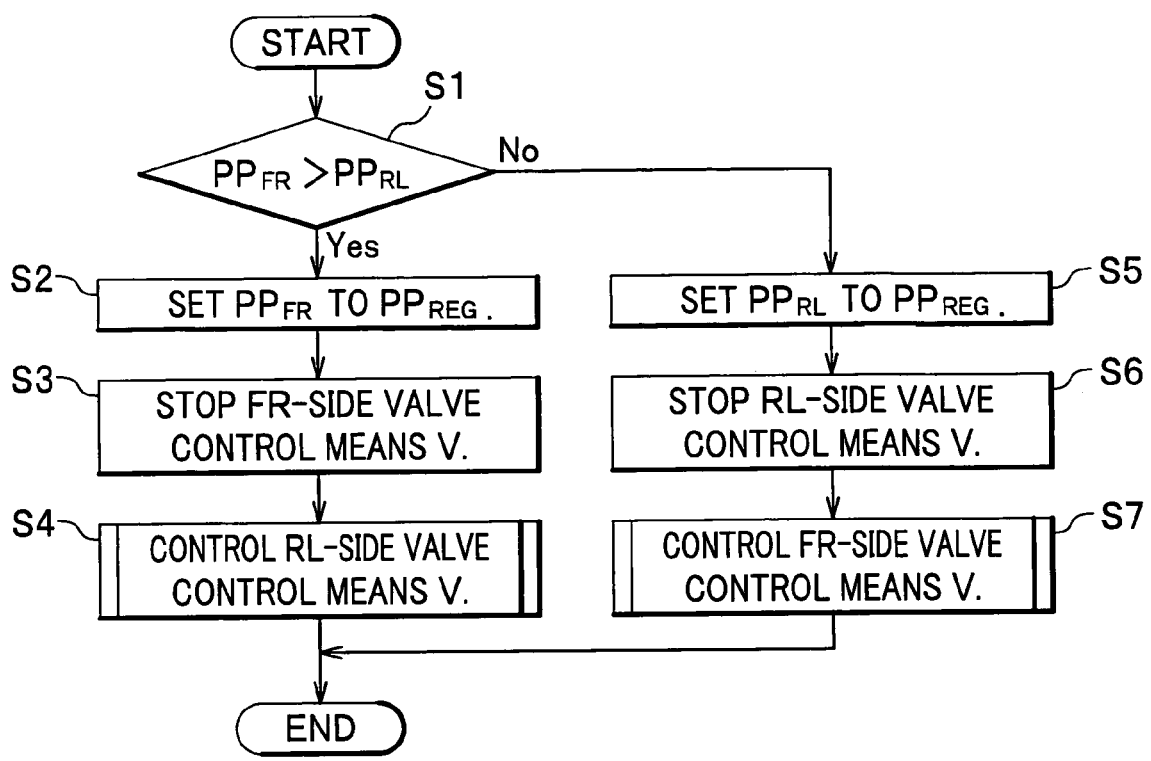
FIG. 5 is a flowchart showing a process by a control device.
Figure 6:
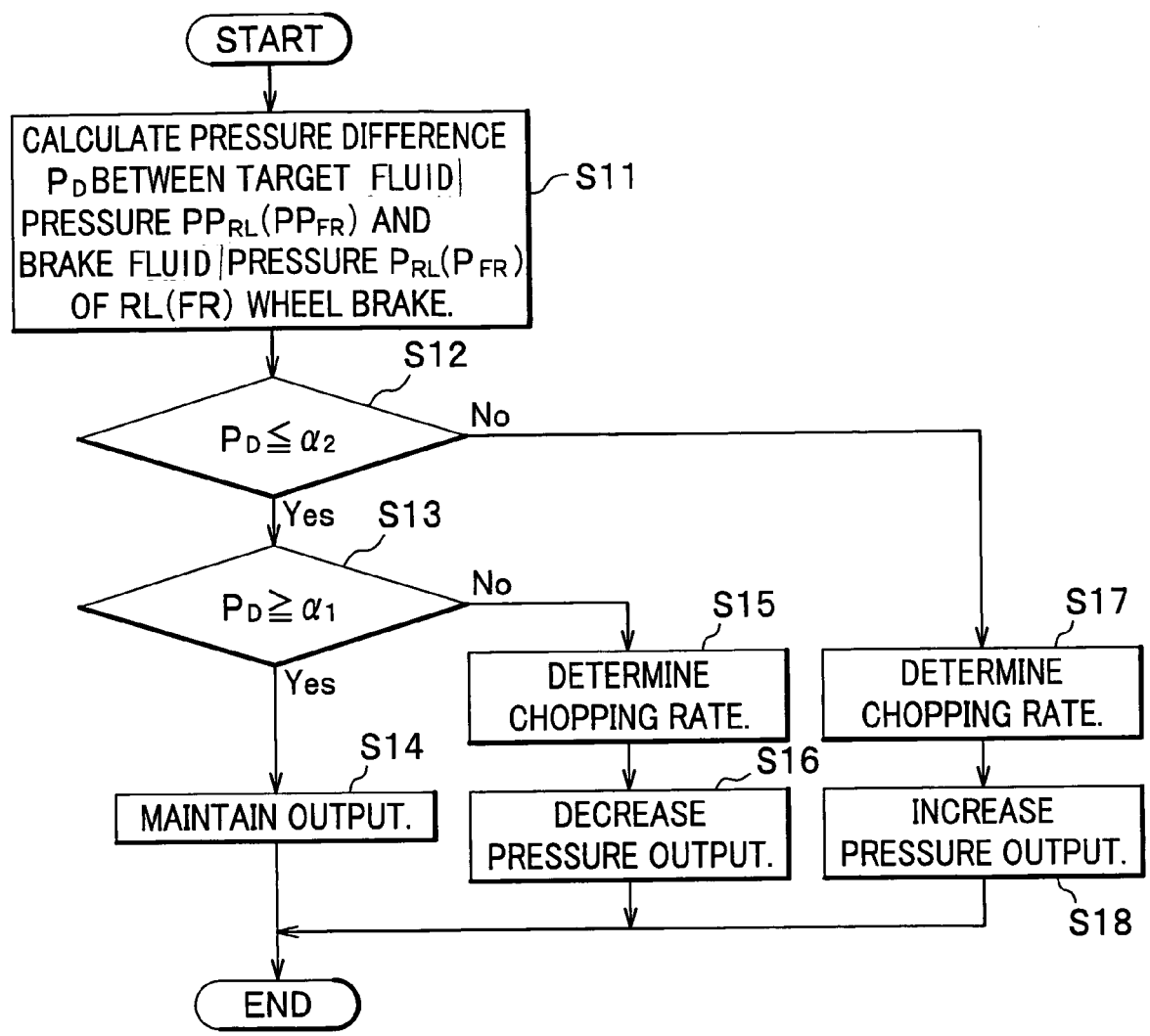
FIG. 6 is a flowchart showing a process by a control device.

FIGS. 5, 6 are flowcharts each showing a process by a control device.

As shown in FIG. 5, the control device 20 compares the target fluid pressure $PP_{FR}$ of the front right wheel brake FR and the target fluid pressure $PP_{RL}$ of the rear left wheel brake RL (Step 1).

If the target fluid pressure $PP_{FR}$ is greater than the target fluid pressure $PP_{RL}$ (Yes in Step 1), then the control device 20 sets the target fluid pressure $PP_{FR}$ to the target fluid pressure $PP_{REG}$ of the cut valve 6 (Step 2), and drive-controls the cut valve 6. Then, the control device 20 stops driving the valve control means V on the side of the front right wheel brake FR (Step 3), and drive-controls the valve control means V on the side of the rear left wheel brake RL (Step 4).

If the target fluid pressure $PP_{FR}$ is equal to or less than the target fluid pressure $PP_{RL}$ (No in Step 1), then the control device 20 sets the target fluid pressure $PP_{RL}$ to the target fluid pressure $PP_{REG}$ of the cut valve 6 (Step 5), and drive-controls the cut valve 6. Then, the control device 20 stops driving the valve control means V on the side of the rear left wheel brake RL (Step 6), and drive-controls the valve control means V on the side of the front right wheel brake FR (Step 7).

Next, referring to FIG. 6 showing a subroutine of Steps 4 and 7, a drive-control of the valve control means V will be described.

First, the control device 20 calculates a pressure difference $P_D$ between the target fluid pressure $PP_{RL}$ ($PP_{FR}$) and the brake fluid pressure $P_{RL}$ ($P_{FR}$) of the wheel brake RL (or FR) (Step 11). The pressure difference $P_D$ is obtained by the following equations.

$$P_D = PP_{RL} - P_{RL}$$

or $$P_D = PP_{FR} - P_{FR}$$

Next, the control device 20 determines whether or not the pressure difference $P_D$ is within a predetermined range (here, one meeting ,,1≦$P_D$≦,,2, wherein ,,1<0 and ,,2>0).

If the pressure difference $P_D$ is within a predetermined range (,,1≦$P_D$≦,, 2, Yes in Step 12 and Yes in Step 13), then the control device 20 controls the valve control means V to maintain the brake fluid pressure of the wheel brake RL (FR) (Step 14).

If the pressure difference $P_D$ is below the predetermined range ($P_D$<,, 1, Yes in Step 12 and No in Step 13), then the control device 20 determines a chopping rate of the valve control means V based on the pressure difference $P_D$ (Step 15), drives the valve control means V on the side of the wheel brake RL (FR) based on this chopping rate, and decreases the brake fluid pressure $P_{RL}$ ($P_{FR}$) of the wheel brake RL (FR) to bring the pressure $P_{RL}$ closer to the target fluid pressure $PP_{RL}$ ($PP_{FR}$) (Step 16).

If the pressure difference $P_D$ is above the predetermined range ($P_D$>,, 2 and No in Step 12), then the control device 20 determines a chopping rate of the valve control means V based on the pressure difference $P_D$ (Step 17), drives the valve control means V on the side of the wheel brake RL (FR) based on this chopping rate, and increases the brake fluid pressure $P_{RL}$ ($P_{FR}$) of the wheel brake RL (FR) to bring the pressure $P_{RL}$ closer to the target fluid pressure $PP_{RL}$ ($PP_{FR}$) (Step 18).

(Drive-Control of Cut Valve Based on Drive Number of Valve Control Means)

Next will be described a drive-control of the cut valve 6 based on a drive number of the valve control means V.

Figure 7A:
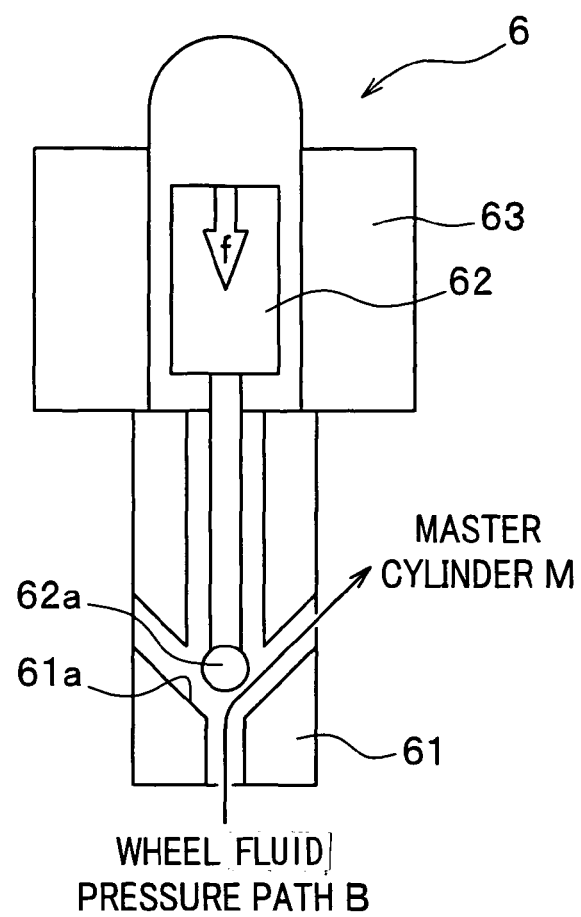
FIG. 7A is a schematic view of a cut valve.
Figure 7B:
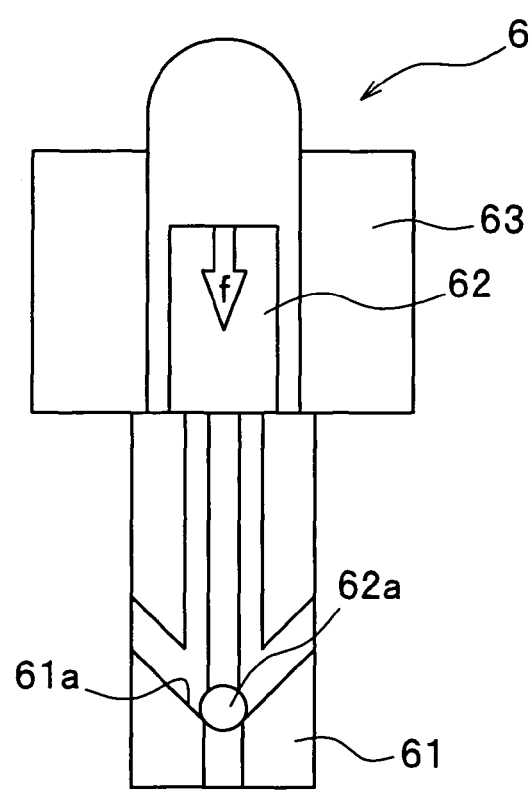
FIG. 7B is a schematic view of a cut valve.

FIGS. 7A, 7B are schematic views of the cut valve, wherein the valve is opened and closed, respectively, both with a thrust being applied to the valve.

As shown in FIG. 7A, the cut valve 6 comprises a fixed core 61 having a valve seat 61a and a movable core 62 having a valve body 62a. In a normal state, a separation between the valve seat 61a and the valve body 62a allows a brake fluid to flow through the valve. The brake fluid flow is shut off by applying a thrust f to the movable core 62 to press the valve body 62a to the valve seat 61a.

The thrust f applied to the movable core 62 of the cut valve 6 depends on a current (indication current) I applied to the electro-magnetic coil 63. Changing of the indicator current I can change the thrust f in magnitude. In other words, increasing and decreasing the indicator current I cause the thrust f to increase and decrease, respectively.

As shown in FIG. 7A, when the pump 4 (see FIG. 2) discharges a brake fluid, the pressure with which the brake fluid pushes the valve body 62a exceeds the thrust f of the movable core 62, and thereby opens the cut valve 6 and releases the brake fluid from the side of the wheel fluid pressure path B to the side of the master cylinder M.

As shown in FIG. 7B, the release of the brake fluid brings the pressure with which the brake fluid pushes the valve body 62a below the thrust f of the movable core 62, and thereby closes the cut valve 6 and maintains the brake fluid pressure on the side of the wheel fluid pressure path B.

In case that the target fluid pressure $PP_{FR}$ of the front right wheel brake FR is equal to the target fluid pressure $PP_{RL}$ of the rear left wheel brake RL, the amount of brake fluid returned to the master cylinder M by one opening/closing operation depends on the orifice (shape of flow path) in the cut valve 6, and is always constant.

Because the time required for opening and closing the cut valve 6 is approximately constant, the total amount of brake fluid returned to the side of the master cylinder M by one opening/closing operation is also constant.

In case that two wheel brakes are the objects of the pressure-adjustment control in one system, there exists more amount of brake fluid to be pressure-controlled than when one wheel brake is the object of the pressure-adjustment in the system.

However, in the above-mentioned two cases, driving of the cut valve 6 in the same manner results in a difference in brake fluid pressure (cut valve fluid pressure $P_{REG}$) between the two cases due to the constant amount of brake fluid returned to the master cylinder M.

To be specific, when one wheel is the object of the pressure-adjustment control, the ratio of the brake fluid to be returned to the master cylinder M with respect to the brake fluid to be controlled becomes greater than when two wheels are the objects of the pressure-adjustment control. As a result, the brake fluid pressure (cut valve fluid pressure $P_{REG}$) is decreased.

To counter this, the cut valve actuating portion 23b drives the cut valve 6 so that, for a constant target fluid pressure $PP_{REG}$, the larger the number of the wheel brakes for pressure adjustment, the larger the amount of brake fluid returned from the cut valve 6, so as to prevent the cut valve fluid pressure $P_{REG}$ from deviating from the target fluid pressure $PP_{REG}$. The cut valve 6 of the embodiment, which is of normally-open-type, is so designed that the larger the number of the wheel brakes for pressure adjustment, the smaller the thrust f to be applied to the movable core 62, for the brake fluid to easily return to the master cylinder M.

In other words, the smaller the number of the wheel brakes for pressure adjustment, the larger the current (indicator current) I applied to the electro-magnetic coil 63.

In this embodiment, the indicator current I for pressure-adjusting two wheels is referred to as a basic indicator current $I_B$. The indicator current I for pressure-adjusting only one wheel is obtained by adding the basic indicator current $I_B$ with an offset current $I_{OFF}$.

The basic indicator current $I_B$ depends on the target fluid pressure $PP_{REG}$ of the cut valve 6 and the rotation number (corresponding to duty ratio) of the motor 9. A correspondence among these elements is stored as a map in a memory portion 29.

The offset current $I_{OFF}$ also depends on the target fluid pressure $PP_{REG}$ of the cut valve 6 and a rotation number of the motor 9. A correspondence among these elements is stored as a map in a memory portion 29.

FIGS. 8A, 8B are maps of offset currents in controlling only front and rear wheels, respectively, where $PP_1<PP_2<PP_3<PP_4$ and $r_1<r_2<r_3$.

The memory portion 29 stores, as maps of offset currents, maps MA1 and MA2 for pressure-adjusting only front and rear wheels, respectively.

Here, for a constant target fluid pressure $PP_{REG}$, the larger the rotation number of the motor 9, the larger the offset current $I_{OFF}$ (e.g., $I_{11} \leq I_{21} \leq I_{31}$). For a constant rotation number of the motor 9, the larger the target fluid pressure $PP_{REG}$, the larger the offset current $I_{OFF}$ (e.g., $I_{11} \leq I_{12} \leq I_{13} \leq I_{14}$).

The offset current $I_{OFF}$ is greater when pressure-adjusting only a rear wheel than when pressure-adjusting only a front wheel (e.g., $I_{11}' \geq I_{11}$). This is because a wheel brake of a front wheel uses more brake fluid than a wheel brake of a rear wheel.

Next will be described a drive process of the cut valve 6 by the control device 20, focusing on the second system having the wheel brakes FR, RL.

Figure 9:
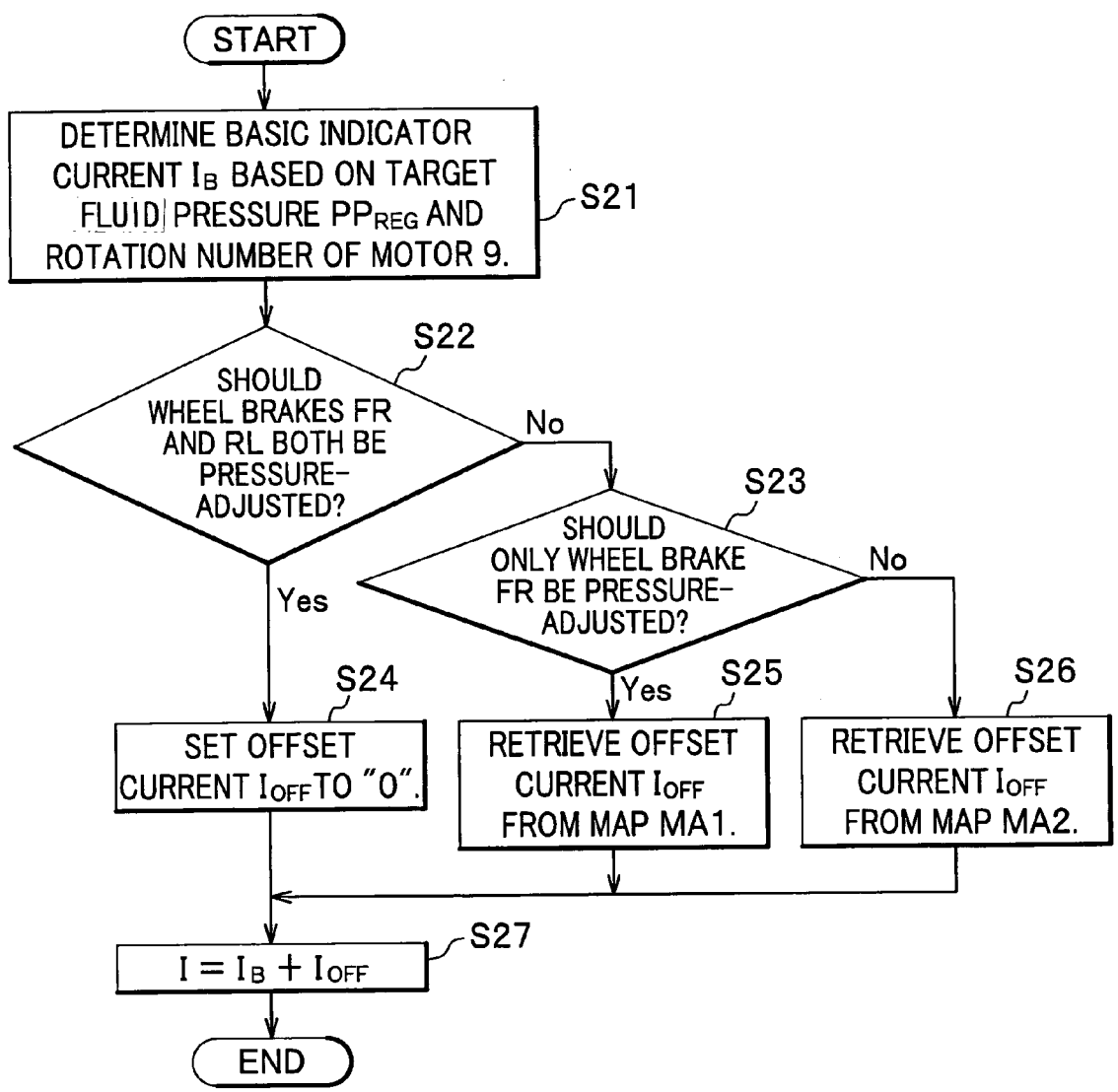
FIG. 9 is a flowchart showing an indicator current determination process by a control device.

FIG. 9 is a flowchart showing an indicator current determination process by the control device.

As shown in FIG. 9, the control device 20 determines the basic indicator current $I_B$ based on the target fluid pressure $PP_{REG}$ of the cut valve 6 and the rotation number of the motor 9 (Step 21). Then, the control device 20 determines the number of wheel brakes to be pressure-adjusted in the second system.

When pressure-adjusting both of the front right wheel brake FR and the rear left wheel brake RL (Yes in Step 22), the control device 20 sets the offset current $I_{OFF}$ to "0" (Step 24).

When pressure-adjusting only the front right wheel brake FR (No in Step 22 and Yes in Step 23), the control device 20 retrieves an offset current $I_{OFF}$ from the map MA1 (Step 25).

When pressure-adjusting only the rear left wheel brake RL (No in Step 22 and No in Step 23), the control device 20 retrieves an offset current $I_{OFF}$ from the map MA2 (Step 26).

Next, the control device 20 calculates an indicator current I based on the basic indicator current $I_B$ and the offset current $I_{OFF}$ (Step 27), from the following equation.

$$I = I_B + I_{OFF}$$

The above-described brake fluid pressure control device for vehicles 100 provides the following effects.

It becomes unnecessary to drive-control the valve control means V corresponding to the wheel brake having a higher target fluid pressure in each system, thus allowing for adjusting with a simple control a brake fluid pressure applied to the wheel brakes.

Use of a linear solenoid valve as the cut valve 6 can reduce more noise than when using a non-linear type solenoid valve as the valve 6.

Regarding the target fluid pressures of the wheel brakes in a same system, the higher pressure is set as the target fluid pressure of the cut valve 6. This makes it possible to minimize the necessary drive amount of the cut valve 6, and thereby reduce unnecessary power consumption.

The capability of linear-controlling one wheel brake in each system allows for a smoother vehicle-behavior control.

In a low temperature and in an occurrence of knock-back, for example, the brakes have a lower-than-normal pressure-up performance, thereby reducing the accuracy of the brake fluid pressure obtained by calculation. Even in this case, one wheel brake can be pressurized using a target fluid pressure of the cut valve 6, thus allowing for a more assured pressurization to the target fluid pressure.

In particular, employing of the X-pipe arrangement renders the wheel brakes on a same side, e.g., the wheel brakes FL, RL (or FR, RR), less prone to be high-select than when employing the front/rear pipe arrangement. This makes it less likely that one side will be linear-controlled by the cut valve 6 while the other side chopping-controlled by the valve control means V. As a result, the behavioral stability of the vehicle CR is increased.

In addition, the larger the number of wheel brakes to be pressure-adjusted, the smaller the thrust f of the cut valve 6 and the larger the amount of brake fluid to be returned to the master cylinder M. Therefore, it is possible to prevent that a difference in the number of wheel brakes to be pressure-adjusted results in a difference in brake fluid pressure which is pressure-adjusted by the cut valve 6.

Although an embodiment of the invention has been described above, the invention is not limited thereto but may be appropriately modified without departing from the spirit and scope of the invention. For example, the rotation number of the motor 9 may be controlled by a technique other than duty-control, such as an applied-voltage control.

Further, the control based on the flowcharts of FIGS. 5, 6 may be applied to behavior stabilization control and traction control, for example.

What is claimed is:

1. A brake fluid pressure control device for vehicles having an X-pipe arrangement, which includes:
   a first system connecting front left and rear right wheel brakes; and
   a second system connecting front right and rear left wheel brakes,
   wherein each of the first and second systems includes
   a first fluid pressure path connected to fluid pressure supply means and
   a second fluid pressure path,
   the first fluid pressure path being connected via the second fluid pressure path to each of the wheel brakes of the first and second systems, and controls a brake fluid pressure of each of the wheel brakes to a respective target fluid pressure, and
   wherein the brake fluid pressure control device for vehicles comprises in each of the systems of the X-pipe arrangement:
   a linear solenoid valve provided to the first fluid pressure path, wherein
     the linear solenoid valve comprises a valve seat and a valve body for providing a valve opening for brake fluid to flow when a separation is present between the valve seat and the valve body, and a moveable core to apply a thrust to the valve body for closing the separation, and
   the linear solenoid valve adjusts a valve opening pressure, at which the separation occurs, by controlling a level of electric current provided to an electro-magnetic coil of the linear solenoid valve, the level of electric current being selected from a plurality of levels of electric current;
   a pump, capable of pressurizing a brake fluid, communicating with the first fluid path on a side of the linear solenoid valve toward the wheel brakes;
   a motor for driving the pump; and
   a valve control means associated with each wheel brake, provided on the second fluid pressure path, and
   the brake fluid pressure control device for vehicles further comprises:
   a target fluid pressure setting portion for setting a target fluid pressure for each of the wheel brakes; and
   a valve actuating portion for drive-controlling the linear solenoid valve and the valve control means, based on the target fluid pressure, wherein
   the linear solenoid valve is drive-controlled by increasing and decreasing the level of current provided to the electro-magnetic coil to cause the thrust to increase and decrease respectively, and
   the valve actuating portion performs, in each of the systems, the operations of drive-controlling the linear solenoid valve by using a higher one of the target fluid pressures of the wheel brakes as a target fluid pressure of the first fluid pressure path, to control a brake fluid pressure of the wheel brake having the higher target fluid pressure by driving only the linear solenoid valve, and of controlling a brake fluid pressure of a wheel brake having a lower target fluid pressure by driving the valve control means corresponding to the wheel brake having the lower target fluid pressure, wherein
   when the pump pressurizes the brake fluid, the valve actuating portion performs in each of the systems the operation of driving the linear solenoid valve so that the larger the number of the brakes to be pressure-adjusted, the larger the amount of brake fluid to be returned from the linear solenoid valve to the side of the fluid pressure supply means, for a same target fluid pressure of the first fluid pressure path, and wherein the valve actuating portion determines a basic indicator current provided to the electro -magnetic coil of the linear solenoid valve for pressure adjusting two wheels on the basis of a rotation number of the motor for driving the pump, the valve actuating portion determines an indicator current provided to the electro-magnetic coil of the linear solenoid valve for pressure adjusting only one wheel, the indicator current being the basic indicator current increased by an offset current; and the basic indicator current is larger for a larger rotation number of the motor for driving the pump.

2. The brake fluid pressure control device for vehicles according to claim 1, wherein the valve drive portion is arranged to drive the linear solenoid valve so that the larger the number of the wheel brakes for pressure adjustment, the smaller the thrust to be applied to the valve body, for a same target fluid pressure of the first fluid pressure path in each of the systems, when the pump pressurizes a brake fluid pressure.

3. A brake fluid pressure control device for vehicles having an X-pipe arrangement, which includes:

a first system connecting front left and rear right wheel brakes; and a second system connecting front right and rear left wheel brakes, wherein each of the first and second systems includes a first fluid pressure path being connected to fluid pressure supply means and a second fluid pressure path, the first fluid pressure path being connected via the second fluid pressure path to each of the wheel brakes of the first and second systems, and controls a brake fluid pressure of each of the wheel brakes to a respective target fluid pressure, and wherein the brake fluid pressure control device for vehicles comprises in each of the systems of the X-pipe arrangement:

a linear solenoid valve provided to the first fluid pressure path, wherein the linear solenoid valve comprises a valve seat and a valve body for providing a valve opening for brake fluid to flow when a separation is present between the valve seat and the valve body, and a moveable core to apply a thrust to the valve body for closing the separation, and the linear solenoid valve adjusts a valve opening pressure, at which the separation occurs, by controlling a level of electric current provided to an electro-magnetic coil of the linear solenoid valve, the level of electric current being selected from a plurality of levels of electric current;

a pump capable of pressurizing a brake fluid communicating with the first fluid pressure path on a side of the linear solenoid valve toward the wheel brakes;

a motor for driving the pump;

a valve control means provided associated with each wheel brake, on the second fluid pressure path to comprise an inlet valve, a discharge valve, and a check valve, and the brake fluid pressure control device for vehicles further comprises:

a target fluid pressure setting portion for setting a target fluid pressure for each of the wheel brakes; and a valve actuating portion for drive-controlling the linear solenoid valve and the valve control means, based on the target fluid pressure, wherein the linear solenoid valve is drive-controlled by increasing and decreasing the level of current provided to the electro-magnetic coil to cause the thrust to increase and decrease respectively, and the valve actuating portion performs, in each of the systems, the operations of drive -controlling the linear solenoid valve by using a higher one of the target fluid pressures of the wheel brakes as a target fluid pressure of the first fluid pressure path, to control a brake fluid pressure of the wheel brake having the higher target fluid pressure by driving only the linear solenoid valve, and of controlling a brake fluid pressure of a wheel brake having a lower target fluid pressure by driving the valve control means corresponding to the wheel brake having the lower target fluid pressure, wherein the valve drive portion is arranged to drive the linear solenoid valve so that the larger the number of the wheel brakes for pressure adjustment, the smaller the thrust to be applied to the valve body, for a same target fluid pressure of the first fluid pressure path in each of the systems, when the pump pressurizes a brake fluid pressure, the valve actuating portion determines a basic indicator current provided to the electro -magnetic coil of the linear solenoid valve for pressure adjusting two wheels on the basis of a rotation number of the motor for driving the pump, the valve actuating portion determines an indicator current provided to the electro-magnetic coil of the linear solenoid valve for pressure adjusting only one wheel, the indicator current being the basic indicator current increased by an offset current; and the basic indicator current is larger for a larger rotation number of the motor for driving the pump.

4. A brake fluid pressure control method for vehicles having an X-pipe arrangement, which includes:

a first system connecting front left and rear right wheel brakes; and a second system connecting front right and rear left wheel brakes, wherein each of the first and second systems includes:

a first fluid pressure path connected to fluid pressure supply means; and a second fluid pressure path, the first fluid pressure path being connected via the second fluid pressure path to each of the wheel brakes of the first and second systems, and controls a brake fluid pressure of each of the wheel brakes to a respective target fluid pressure, and wherein the brake fluid pressure control device for vehicles comprises in each of the systems of the X-pipe arrangement:

a linear solenoid valve provided to the first fluid pressure path, wherein the linear solenoid valve comprises a valve seat and a valve body for providing a valve opening for brake fluid to flow when a separation is present between the valve seat and the valve body, and a moveable core to apply a thrust to the valve body for closing the separation, and the linear solenoid valve adjusts a valve opening pressure, at which the separation occurs, by controlling a level of electric current provided to an electro-magnetic coil of the linear solenoid valve, the level of electric current being selected from a plurality of levels of electric current;

the linear solenoid valve is capable of adjusting a valve opening pressure by controlling an electric conduction to the linear solenoid valve;

a pump capable of pressurizing a brake fluid communicating with the first fluid pressure path on a side of the linear solenoid valve toward the wheel brakes;

a motor for driving the pump;

a valve control means associated with each wheel brake, provided on the second fluid pressure path, and the brake fluid pressure control device for vehicles further comprises:

a target fluid pressure setting portion for setting a target fluid pressure for each of the wheel brakes; and a valve actuating portion for drive-controlling the linear solenoid valve and the valve control means, based on the target fluid pressure, the brake fluid pressure control method comprising, having the valve actuating portion performing, in each of the systems, the steps of:

1) drive-controlling the linear solenoid valve, by increasing and decreasing the level of current provided to the electro-magnetic coil to cause the thrust to increase and decrease respectively, and using a higher one of the target fluid pressures of the wheel brakes as a target fluid pressure of the first fluid pressure path;

2) controlling a brake fluid pressure of the wheel brake having the higher target fluid pressure by driving only the linear solenoid valve;

3) controlling a brake fluid pressure of a wheel brake having a lower target fluid pressure by driving the valve control means corresponding to the wheel brake having the lower target fluid pressure; and when the pump pressurizes the brake fluid, 4) driving the linear solenoid valve so that the larger the number of the brakes to be pressure-adjusted, the larger the amount of brake fluid to be returned from the linear solenoid valve to the side of the fluid pressure supply means, for a same target fluid pressure of the first pressure path;

5) determining a basic indicator current provided to the electro-magnetic coil of the linear solenoid valve for pressure adjusting two wheels on the basis of a rotation number of the motor for driving the pump; and 6) determining an indicator current provided to the electro-magnetic coil of the linear solenoid valve for pressure adjusting only one wheel, the indicator current being the basic indicator current increased by an offset current; wherein the basic indicator current is larger for a larger rotation number of the motor for driving the pump.

* * * * *